(12) United States Patent
Kamath

(10) Patent No.: US 6,714,402 B2
(45) Date of Patent: Mar. 30, 2004

(54) MICROFABRICATED ELECTROCHEMICAL DEVICE SEPARATORS

(75) Inventor: Hundi P. Kamath, Los Altos, CA (US)

(73) Assignee: Cooper Technologies Company, Houstan, TX (US)

( * ) Notice: Subject to any disclaimer, the term of this patent is extended or adjusted under 35 U.S.C. 154(b) by 0 days.

(21) Appl. No.: 10/140,005

(22) Filed: May 6, 2002

(65) Prior Publication Data

US 2002/0167785 A1 Nov. 14, 2002

Related U.S. Application Data

(60) Provisional application No. 60/289,544, filed on May 7, 2001.

(51) Int. Cl.[7] ................................................ H01G 9/00
(52) U.S. Cl. ....................................................... 361/502
(58) Field of Search ......................... 361/502; 29/25.03, 29/25.01, 25.02

(56) References Cited

U.S. PATENT DOCUMENTS

| | | | | |
|---|---|---|---|---|
| 5,260,855 A | * | 11/1993 | Kaschmitter et al. | ....... 361/502 |
| 5,682,288 A | | 10/1997 | Wani | |
| 6,094,788 A | * | 8/2000 | Farahmandi et al. | ....... 29/25.41 |

FOREIGN PATENT DOCUMENTS

| | | |
|---|---|---|
| EP | 1 096 521 A2 | 5/2001 |
| JP | 2001-15389 | 1/2001 |

\* cited by examiner

Primary Examiner—Craig Thompson
(74) Attorney, Agent, or Firm—Beyer Weaver & Thomas LLP

(57) ABSTRACT

Provided are electrochemical (e.g., double layer capacitor) cell designs, and methods of their manufacture, which reduce both cell size and impedance while maintaining inter-electrode dielectric integrity and cell performance and facilitating manufacturing. The designs adapt mircofabrication techniques from the field of semiconductor fabrication in order to form and pattern thin dielectric films on electrodes. Existing microfabrication techniques allow for the formation of dielectric (e.g., polyimide) films having a thickness of about 1 to 2 microns. Dielectric films formed on electrodes may be patterned according to well known procedures in the semiconductor fabrication field to provide area for unimpeded ion exchange between the electrodes. The patterning may produce contiguous or noncontiguous dielectric layers between the electrodes having porosity of about 30 to 80%, preferably about 60 to 80% while dielectric integrity is maintained. The result is a lower impedance, higher performance, easily fabricated double layer capacitor cell.

2 Claims, 3 Drawing Sheets

MICROFABRICATED ELECTROCHEMICAL DEVICE SEPARATORS

CROSS-REFERENCE TO RELATED APPLICATIONS

This application claims priority from U.S. Provisional Application No. 60/289,544 entitled MICROFABRICATED ELECTROCHEMICAL DEVICE SEPARATORS, filed May 7, 2001, the disclosure of which is incorporated by reference herein for all purposes.

BACKGROUND OF THE INVENTION

1. Field of the Invention

The present invention relates to electrochemical cells and methods for their manufacture. More particularly, the invention relates to microfabricated electrochemical device separators, in particular for double layer capacitor cells, which provide improved cell performance including decreased impedance.

2. Description of the Related Art

Unlike a battery, a capacitor cannot produce electrons by chemical reaction. However, capacitors, have a distinct advantage over batteries in certain applications in that that they can be recharged incrementally and quickly. Thus, capacitors are advantageously used in hybrid systems in conjunction with batteries to support brief high current demands through pulse discharges. Also, they may be used for power storage and as stand-alone power back-ups, for example, to provide a stable power source for computer memory in the event of a primary power source failure.

There are two principal types of capacitors: Parallel plate, and double layer. A parallel plate capacitor is composed of two electrically conductive (typically metal) plates (electrodes) separated by a dielectric. A difference in charge on the two electrodes is maintained by the dielectric between them giving rise to capacitance.

Double layer capacitors include at least one inert, high surface-area electrode and an electrolyte. Their capacitance arises from a separation of charged species at the electrolyte-electrode interface (i.e., the "double layer"). Typically the charge separation distance is on the order of atomic dimensions. The capacitors are often referred to as "supercapacitors" because of their potentially enormous capacitance (possibly as high as farads or tens of farads per gram). This high capacitance results from a combination of the very small charge separation distance inherent in double layers coupled with a particularly high surface area of the electrodes (often on the order of thousands of meters squared per gram).

A typical double layer capacitor cell contains two electrodes separated by a dielectric (typically an electrode separator) to maintain electrical isolation between the electrodes. These double layer capacitors are charged by applying a voltage across the two electrodes and thereby increasing the total charge stored in the double layer of each electrode. The voltage difference across the two electrodes can continue to increase during charge so long as the leakage current between the electrodes remains low. Ultimately, however, the potential difference between the two electrodes will reach a level where the electrolyte solvent is electrolyzed (introducing a large source of leakage current). Generally, electrolysis of the electrolyte is to be avoided in double layer capacitors because it can cause, among other detrimental effects, loss of electrolyte, increased pressure in the cell, and formation of explosive mixtures (oxygen and hydrogen in the case of aqueous electrolytes).

Conventional double layer capacitor devices are typically packaged in a metal container. FIGS. 1A and 1B illustrate simplified examples of such packages:

FIG. 1A shows a conventional double layer capacitor device package of a metal can with protruding leads. The capacitor 100 is composed of a pair of electrodes 102, 104 separated by a separator material 106 and wound into a roll 109. The separator 106 is typically a porous electrically insulating material, such as polyethylene. An electrolyte is also present between the two electrodes, typically permeating the separator. The purpose of the electrolyte in a double layer capacitor is to provide ion transport between the electrodes. Electrolytes for this purpose may be aqueous or organic. Suitable aqueous electrolytes include dilute acids and alkaline solutions such as 30% sulfuric acid or 40% potassium hydroxide. Suitable organic electrolytes include quarternary ammonium salts dissolved in a solvent such as propylene or ethylene carbonate. The capacitor components are contained in a metal, typically aluminum or steel, can 108. Leads 110 connected to the two electrodes 102, 104 protrude from the can 108 for external electrical connection.

FIG. 1B shows a conventional double layer capacitor device package of a coin cell. The capacitor 120 is again composed of a pair of electrodes 122, 124, in this case disks, separated by a separator material 126. The separator 126 is typically a porous electrically insulating material, such as polyethylene. An electrolyte is also present between the two electrodes, typically permeating the separator. The capacitor components are contained in a metal, typically aluminum or steel, package 128 composed of a case 130 and a cap 132. In this package, rather than protruding leads, where the metal package itself acts as a lead for external electrical connection.

Conventional separator materials for these electrochemical devices are paper, porous polymer (e.g., polyethylene) materials, and glass fiber mats. These materials have typical minimal thicknesses of about 30–80 microns, 8–9 microns, and 200 microns, respectively. The porosity of paper and polymer separators is typically about 30–50% and that of glass fiber may be as much as 80%. These conventional separator materials also each have an element of "tortuosity," that is, the degree to which the pores (or other paths through the materials) depart from a straight line. The greater the tortuosity of a porous material, the more the paths, on average, depart from a straight line, and the more resistance there is to passage of electrolyte, salts and ions through the separator material.

In a multi-electrode double layer capacitor cell, the migration of ions in the electrolyte from one electrode interface to the other occurs during charging and discharging of the device. Efficient ionic transport means lower impedance resulting in faster charge and higher power delivery. The less efficient the ionic transport through the separator, the higher the impedance of the device. Also, cell impedance is affected by the distance between the electrodes. The greater the distance between the electrodes, the less efficient the ionic transport and the greater the impedance of the cell. Further, decreasing the distance between the electrodes in a multi-electrode double layer capacitor cell would allow for the incorporation of more active material (i.e., carbon) in a given cell volume so that the volumetric capacitance (e.g., farads (F)/cc) might be increased beyond the 1 to 5 F/cc of state of the art commercial products.

Accordingly, in order to produce lower impedance double layer capacitor cells and to increase volumetric capacitance, it would be desirable to reduce the distance between electrodes in double layer capacitors and to increase the proportion of the area between the electrodes available for ionic transport while facilitating the manufacturing of the cells.

SUMMARY OF THE INVENTION

The present invention addresses this need by providing electrochemical (e.g., double layer capacitor) cell designs and methods of their manufacture, which reduce cell impedance and increase volumetric capacitance while maintaining inter-electrode dielectric integrity and cell performance and facilitating manufacturing. The designs adapt mircofabrication techniques from the field of semiconductor fabrication in order to form and pattern thin dielectric films on electrodes. Existing microfabrication techniques allow for the formation of dielectric (e.g., polyimide) films having a thickness of about 1 to 2 microns. Dielectric films formed on electrodes may be patterned according to well known procedures in the semiconductor fabrication field to provide area for unimpeded ion exchange between the electrodes. The patterning may produce contiguous or noncontiguous dielectric layers between the electrodes having porosity of about 30 to 80%, preferably about 60 to 80% while dielectric integrity is maintained. The result is a lower impedance, higher performance, easily fabricated double layer capacitor cell.

In one aspect, the invention pertains to an electrochemical cell. The cell includes a cell container, a first electrode provided within the cell container, a microfabricated porous dielectric disposed on the first electrode, a second electrode provided within the cell container disposed adjacent to the microfabricated porous dielectric such that the microfabricated porous dielectric provides electrical isolation of the electrodes, and an electrolyte provided within the cell container. Electrochemical structures incorporating microfabricated porous dielectrics that may be used as cell components are also provided.

In another aspect, the invention pertains to a method of making an electrochemical cell. The method involves microfabricating a dielectric layer on a first electrode, positioning a second electrode adjacent to the microfabricated dielectric layer, placing the electrodes in a cell container, providing an electrolyte in the cell container, laminating the electrode and dielectric layers, and sealing the cell.

These and other features and advantages of the present invention are described below with reference to the drawings.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides electrochemical (e.g., double layer capacitor) cell designs, and methods for their manufacture, which reduce cell impedance and increase volumetric capacitance while maintaining inter-electrode dielectric integrity and cell performance and facilitating manufacturing. The designs adapt mircofabrication techniques from the field of semiconductor fabrication in order to form and pattern thin dielectric films on electrodes. Existing microfabrication techniques allow for the formation of dielectric (e.g., polyimide) films having a thickness of about 1 to 2 microns. Dielectric films formed on electrodes may be patterned according to well known procedures in the semiconductor fabrication field to provide area for unimpeded ion exchange between the electrodes. The patterning may produce contiguous or noncontiguous dielectric layers between the electrodes having porosity of about 30 to 80%, preferably about 60 to 80% while dielectric integrity is maintained. The result is a lower impedance, higher performance, easily fabricated double layer capacitor cell.

Figure 1A:
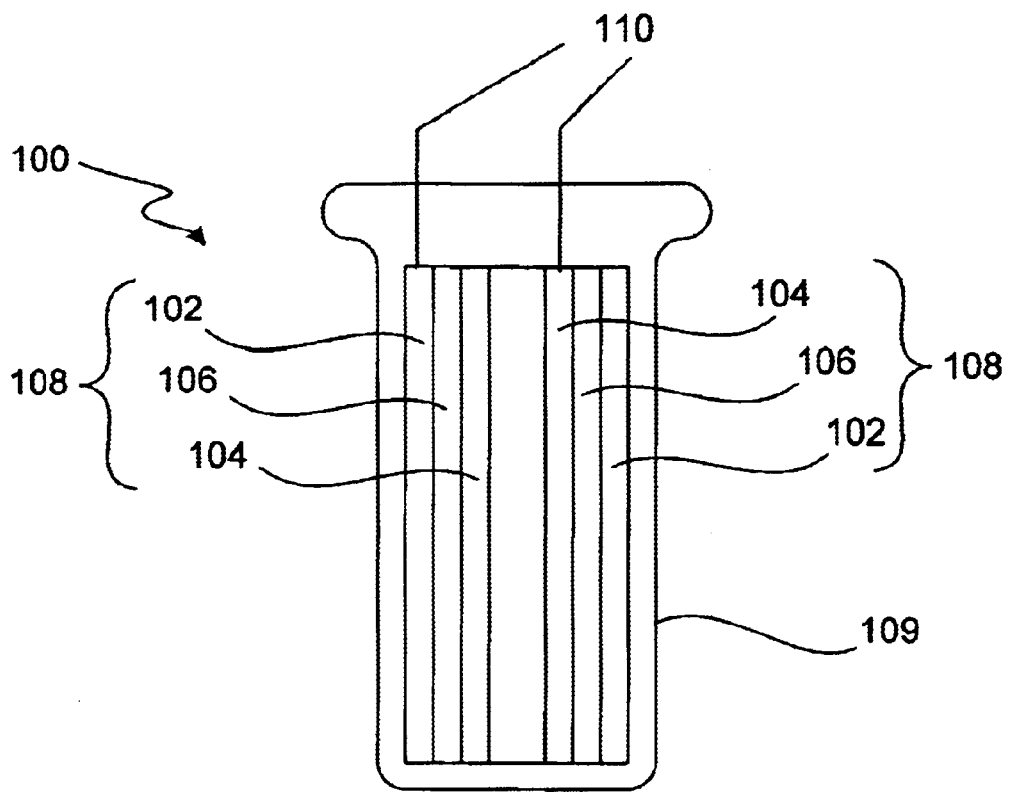
FIGS. 1A and 1B depict cross-sectional views of conventional double layer capacitor package designs.
Figure 1B:
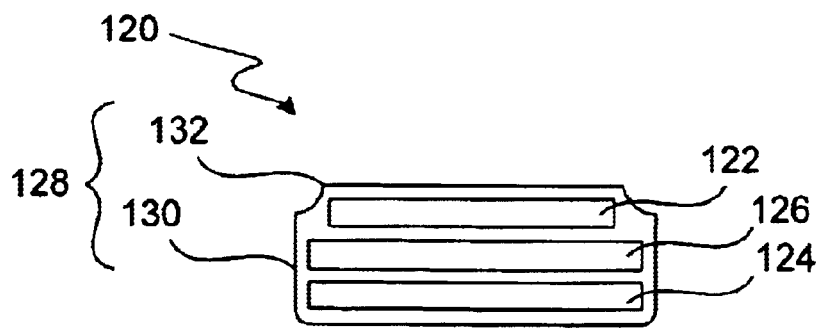
Figure 2:
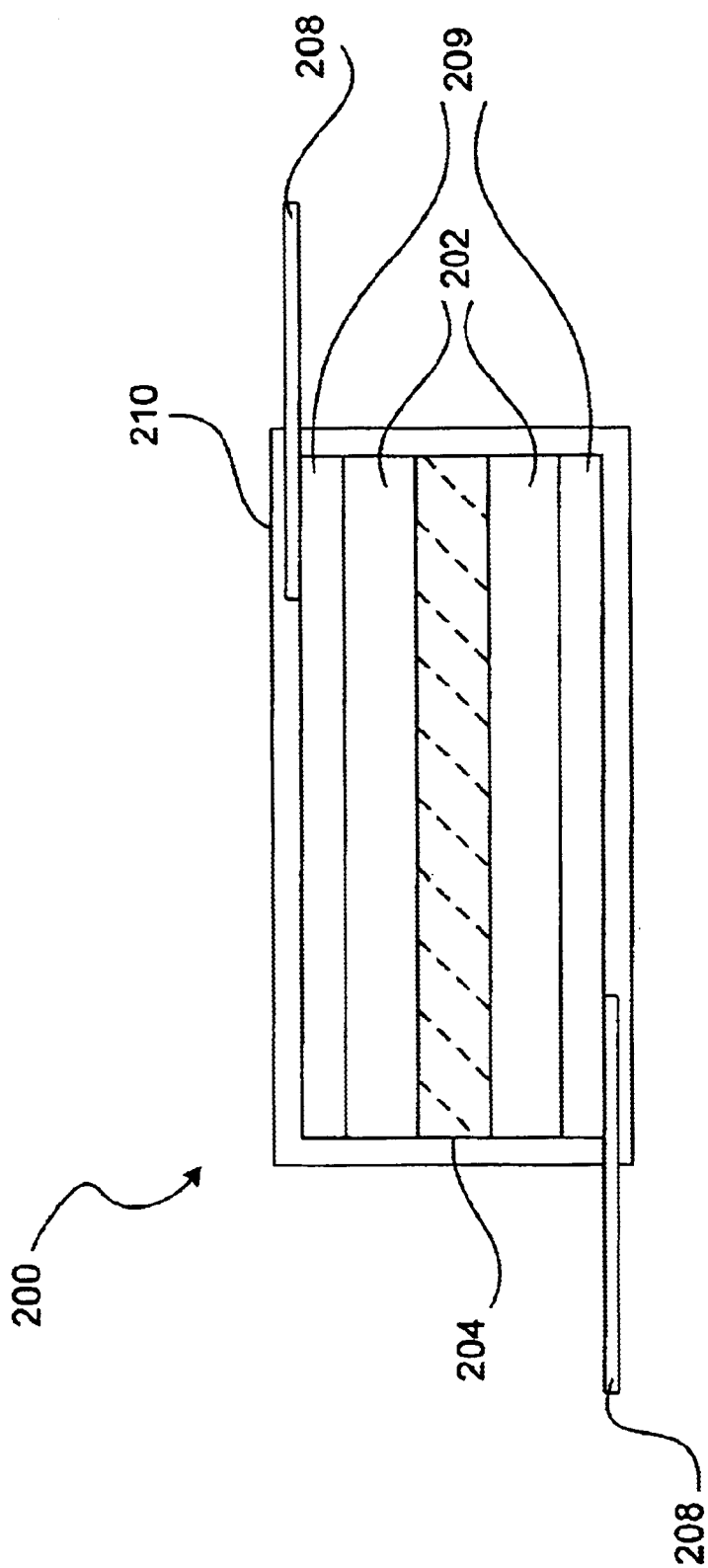
FIG. 2 depicts a cross-sectional view of a double layer capacitor cell in accordance with one embodiment of the present invention.

FIG. 2 shows a cross-sectional view of a preferred embodiment of the present invention in which a double layer capacitor cell is provided in a package. The cell 200 is composed of two electrodes 202. The electrodes 202 preferably, but not necessarily, have the same composition. The electrodes may be made from any high surface area, inert, and conductive material. Preferably, however, the electrodes are made from a high surface-area carbon-based material such as activated carbon composites, carbon fiber cloths, carbon power with binders, or carbon fiber cloths with metal fibers. In general, any carbon-based electrode can be "activated" by, for example, controlled oxidation to increase the surface area. Activation techniques are discussed in, for example, U.S. Pat. No. 4,713,731 to Boos et al. which is incorporated herein by reference for all purposes. In addition to carbon-based electrodes, ruthenium oxide ($RuO_2$) based composites (and other electrode materials commonly used in double layer capacitors) may be suitable electrode materials for the present invention.

In particularly preferred embodiments, the electrodes are made from carbon aerogel foams. Such foams have been found to exhibit superior characteristics such as low resistance and high specific capacitance when used in double layer capacitors. Carbon aerogel capacitors and their manufacture are described in U.S. Pat. No. 5,260,855 issued to Kaschmitter et al. and incorporated herein by reference for all purposes. Various modifications of a basic carbon aerogel structure are within the scope of this invention.

In general, carbon aerogels suitable for use with this invention can be made according to the following procedure. First, specified reactants are mixed with a catalyst and may include the addition of metals. The reactants include resorcinol (1,3-dihydroxybenzene), phenol, catechol, phloroglucinol, or other hydroxybenzene compounds that react in the appropriate ratio with aldehydes (e.g., formaldehyde or furfural). Preferred combinations include resorcinol-formaldehyde, phenol-resorcinol-formaldehyde, resorcinol-formaldehyde, catechol-formaldehyde, and phloroglucinol-formaldehyde. An aquagel which is formed by polymerization is then dried in solvent exchange and extraction steps as is known in the art. The resulting organic aerogel is subsequently pyrolyzed in an inert atmosphere or vacuum to form a carbon aerogel. In alternative embodiments, the pyrolysis atmosphere includes small amounts of hydrogen or other appropriate material which at least partially reacts with the carbon surface.

The aquagels are formed through a sol-gel polymerization of multifunctional organic monomers (mentioned above) in a solvent, typically water, leading to the formation of highly cross-linked, transparent gels. For example, in a preferred embodiment, one mole of resorcinol (1,3-dihydroxybenzene) condenses in the presence of a basic catalyst with two moles of formaldehyde. Mildly basic catalysts such as sodium carbonate are preferred. In this polymerization, resorcinol is a trifunctional monomer capable of adding formaldehyde in the 2-, 4-, and/or 6-ring positions. The substituted resorcinol rings condense with each other to form nanometer-sized clusters in solution. Eventually, the clusters crosslink through their surface groups (e.g., —$CH_2OH$) to form an aquagel. A full discussion of the chemistry is not provided here since the specific details are described in depth in U.S. Pat. Nos. 4,997,804 and 4,873,218, which are incorporated herein by reference for all purposes.

The size of the clusters is regulated by the concentration of catalyst in the resorcinol-formaldehyde (RF) mixture. More specifically, the mole ratio of resorcinol (R) to catalyst (C), R/C, controls the surface area and electrochemical properties of the resulting gel. In gels having R/C of 100 and 200, it has been found that electrical conductivity increases significantly with increasing density.

After the aquagel is formed, it must be dried to form the aerogel. In some cases, when the polymerization solvent is removed from the gel by simple evaporation, large capillary forces are exerted on the pores, forming a collapsed structure known as a xerogel. In order to preserve the gel skeleton and minimize shrinkage (and thereby provide an aerogel as opposed to a xerogel), it may be necessary to perform the drying step under supercritical conditions. The details of a suitable supercritical drying procedure as well as other aspects of carbon aerogel preparation are provided in U.S. Pat. No. 5,260,855, previously incorporated by reference. In some embodiments, a xerogel or a composite xerogel/aerogel will be used to prepare the electrodes.

In other preferred embodiments, the aerogel structure is provided by simple drying. Specifically, in cases where the aerogels are of sufficiently high density, such as between about 0.4 and 1.2 g/cc, the pore network may have sufficient inherent strength to withstand the drying process without resort to supercritical drying conditions. In such procedures, a solvent such as acetone may be exchanged with water and then slowly evaporated in air to yield a dry aerogel monolith ready for pyrolysis. Such nonsupercritical drying is particularly attractive because of reduced processing time and cost. Following the solvent exchange/extraction step, the organic aerogel is typically pyrolyzed at elevated temperatures about 1050° C. in a vacuum or inert atmosphere of nitrogen, argon, neon or helium to form carbon aerogels. Choice of pyrolysis temperatures (600° C.–2100° C.) will effect the surface area and physical and chemical structure of the carbon aerogel.

While not wishing to be bound by theory, it is believed that carbon aerogel foams serve as superior double layer capacitor electrode materials because (1) they can be made into monolithic carbon structures having low electrical resistance, (2) their pore sizes can be controlled so that all or nearly all available surface area is wetted by the electrolyte, (3) they can be made to have a high surface area density, and (4) they can be provided as chemically pure carbon. In contrast, particulate carbons have higher internal resistances due to interparticle contact resistance and binder resistance. Further, such electrodes may have only a fraction of their available surface area effectively wetted because their pore size distribution extends into a regime where the pore size is on the order of the double layer (i.e., the pores are too small to be effectively wetted). In addition, at such small dimensions, the ionic resistance in the pores may significantly increase. Still further, surface roughness inherent to electrodes composed of particulates increases the likelihood of shorting of electrodes as dielectric thickness is decreased.

While it is sometimes preferred to employ a monolithic carbon aerogel as an electrode material (for the reasons described above), other forms of carbon aerogel are also suitable for some applications. These include (1) microsphere carbon aerogels formed by emulsion polymerization, and (2) crushed carbon aerogels. These materials may be provided with binders on a metallic substrate to form electrodes.

A particularly preferred electrode material for use in the present invention is monolithic carbon aerogel disks. These disks may be of any desired shape. Preferred embodiments include circular and rectangular disks about 5 to 100 mm, more preferably about 5 to 50 mm, in their largest dimension.

Unlike conventional cells, the cell 200 does not have a preformed electrode separator which is inserted in the dielectric region between the individual electrodes. Instead, a dielectric layer 204, composed of polyimide for example, is formed and patterned in situ on one of the electrodes using microfabrication techniques such as are commonly applied in the semiconductor fabrication industry. Dielectric layers may be applied in variety of techniques well known in the art, such as doctor blade or roller coating and a liquid formulation of the dielectric material, followed by drying and patterning. Microfabricated separators in accordance with the present invention may have thickness as low as about 1 micron and may have virtually any level porosity and distribution as long as electrical isolation between the electrodes is maintained. The dielectric layer may be contiguous or noncontiguous and have a porosity of about 30 to 80%, preferably about 60 to 80%. The porosity and distribution may also be precisely defined by microfabrication techniques, as described further below.

An electrolyte 206 is also provided in the dielectric region between the two electrodes 202. Suitable electrolytes for the present invention include aqueous electrolytes such as 40% KOH or 30% sulfuric acid, and non-aqueous electrolytes such as tetraethylammonium tetrafluoroborate ($Et_4N(BF_4)$) salt dissolved in an organic solvent such as propylene carbonate. Other suitable electrolyte compositions for double layer capacitor cells in accordance with the present invention, including solid and gel electrolytes, are known to those of skill in the art.

The electrodes in the cells of the present invention also preferably include or are supplemented by a current collector 209. The current collectors employed in this invention may generally be made from any of a number of different metals including aluminum, titanium, nickel, nickel alloys, etc. Aluminum (Al) is particularly preferred as it is lightweight, inexpensive, posses high electrical conductivity, and is chemically stable in organic electrolytes relative to other current collector materials. The metal current collectors 209 may take the form of disks, foil sheets or they may be spray deposited, for example, using the techniques described in U.S. patent application Ser. No. 09/611,040 entitled CARBON-BONDED METAL STRUCTURES AND METHODS OF FABRICATION, filed Jul. 6, 2000, the disclosure of which is incorporated by reference herein for all purposes. When used, they are positioned on the exterior surface of the electrodes.

Double layer capacitor cells having the having the components described above are packaged in a cell container 210. The container may be a rigid metal, preferably aluminum. More preferably, the cell container 210 may be composed of a foil "pouch." The foil pouch is substantially gas-impermeable barrier material composed a polymer-laminated metal material that is lightweight and flexible. A particularly preferred cell container material is a polymer-laminated aluminum foil, such as the product referred to as Forming Type Laminated Aluminum Foil for Lithium Ion Battery Application available from Showa Aluminum Corporation, Japan (also product number 96031, available from Pharma Center Shelbyville, Inc, of Shelbyville, Ky.). This product is a laminate approximately 120 microns thick composed of a thin (about 45 microns) aluminum foil between polymer film layers of cross-linked polypropylene (about 45 microns) and nylon (about 30 microns). It is cold-formable, chemically resistant to highly polar solvents, seals against ethylene-based materials, and seals to metals such as aluminum, nickel, copper and stainless steel. Further details regarding cells packaged using such a material may be found in U.S. patent application Ser. No. 09/536,225 entitled, FOIL-PACKAGED ELECTROCHEMICAL CAPACITOR CELLS, filed Mar. 27, 2000, the disclosure of which is incorporated by reference herein for all purposes.

In general, leads 208 are connected to the electrodes 202 (via the current collectors 209, if present) and protrude from the package 210 for external electrical connection. Alternatively, the cells may be configured for direct external electrical connection as described in U.S. patent application Ser. No. 09/536,228 entitled STACKABLE ELECTROCHEMICAL CAPACITOR CELLS, filed Mar. 27, 2000, the disclosure of which is incorporated by reference herein for all purposes.

Small and large devices may be fabricated in accordance with the present invention. Multi-layer devices can also be built to either increase voltage (in series configuration) or decrease ESR (in parallel configuration).

Electrochemical structures and cells in accordance with the present invention may be formed by a variety of processes that provide for the formation of a noncontiguous layer of dielectric particles between two electrodes. Such an electrochemical structure may be placed in a cell container, and electrolyte may be provided, either with the dielectric particles or following their application. To complete a cell, the electrode and dielectric layers are laminated and the cell container sealed.

Figure 3:
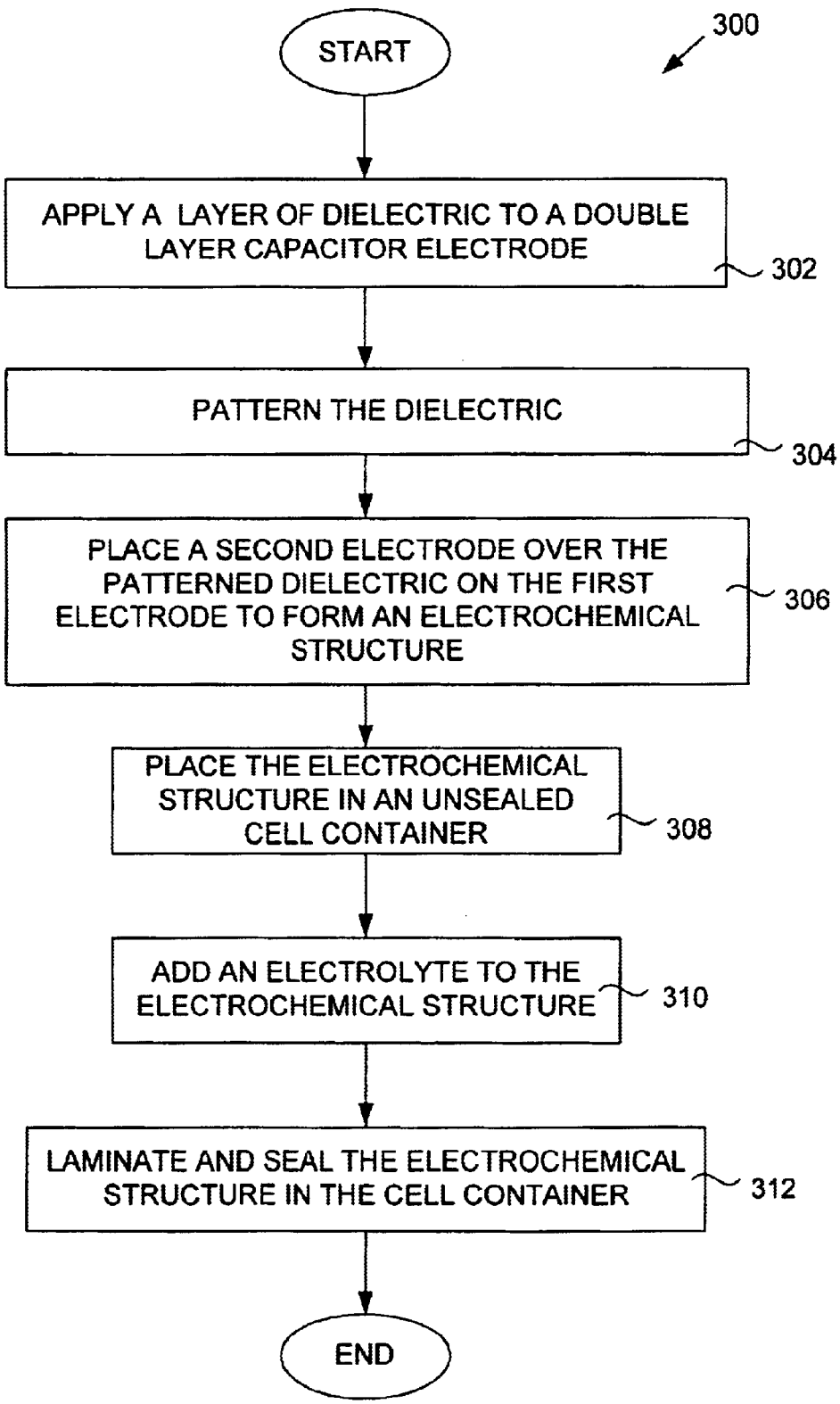
FIG. 3 depicts a flow chart presenting various aspects of the fabrication of electrochemical cells having microfabricated separators in accordance with the one embodiment of the present invention.

Double layer capacitor cells in accordance with the present invention may be manufactured using methods adapted from the field of the semiconductor device (e.g., integrated circuit) fabrication. In one embodiment, depicted in the flow chart 300 of FIG. 3A, a layer of dielectric is applied to a surface of a double layer capacitor electrode such as described above (302). The electrode material is preferably subjected to a surface flattening process prior to application of the dielectric layer by a technique such as polishing, for example chemical mechanical polishing (CMP). The dielectric may be applied to the electrode surface in a liquid form, for example, using a doctor blade, roller, or other technique well known in the semiconductor fabrication arts, and dried (304). The dielectric may also be applied by chemical vapor deposition (CVD), spin-on or other techniques well known in the semiconductor fabrication arts. The thickness of the applied dielectric may be from about 1 to 20 microns, preferably about 1 to 5 microns, more preferably about 1 micron. A preferred dielectric material is polyimide, although other suitable dielectric materials may also be used.

Following application of the dielectric, the dielectric may be patterned by any of a variety of microfabrication techniques (306). The patterning may produce contiguous or noncontiguous dielectric layers between the electrodes while dielectric integrity is maintained. The dielectric may have a porosity of about 30 to 80%, preferably about 60 to 80%. For example, an eximer laser may be used to form holes in the dielectric. The holes may vary in diameter from about 5 to 50 microns. The dielectric may also be patterned using photolithographic techniques commonly applied in the semiconductor industry in conjunction with wet, dry or plasma etching. Implementation of each of these techniques is well known in the art.

Upon completion of the dielectric patterning, a second capacitor electrode is placed upon the microfabricated dielectric (308). As noted above, a dielectric in accordance with the present invention should have a distribution and porosity sufficient to maintain the uniform separation of the two electrodes while maximizing ion flow between the electrodes. Further layering of electrodes and microfabricated dielectric in the same manner may be conducted to provide multi-layered cells of increased capacitance.

The layered electrodes and dielectric may then be placed in an unsealed cell container (packaging) material (310). Suitable cell container materials are described above and may include rigid metals (to form "prismatic" cells) or polymer laminates, such the laminated foil product available from Showa Aluminum Corporation, noted above. Electrolyte may then be injected into the unsealed cell container to fill the space between the electrodes unoccupied by the dielectric (312). In one embodiment, the unsealed cell containers are placed in a dry environment, for example, less than 5% relative humidity, preferably less than 2% (such an environment may be provided in glove box pressure vessel), and filled with non-aqueous electrolyte, preferably nonaqueous electrolyte, such as tetraethylammonium tetrafluoroborate ($Et_4N(BF_4)$) salt dissolved in propylene carbonate. Then, the cell container is then laminated and sealed, for example using conventional techniques (310). For example, by heating under pressure to a temperature sufficient to melt the polymer in a laminated foil barrier sheet, for example, a temperature of about 120° C. for the Pharma Center product.

While the invention has been described above primarily in connection with double layer capacitor cells, it should be noted that it is also applicable to the fabrication of other electrochemical devices, such as batteries and fuel cells. Dielectric structures in accordance with the present invention may also be prepared in connection with the fabrication of other such electrochemical cells using electrode and electrolyte materials well known in the art.

The present invention may be applied to facilitate manufacturing of high performance dielectric between electrochemical device electrodes, in particular in double layer capacitor cells, as well as in other electrical, electronic, and structural applications.

Although the foregoing invention has been described in some detail for purposes of clarity of understanding, it will be apparent that certain changes and modifications may be practiced within the scope of the appended claims. It should be noted that there are many alternative ways of implementing both the processes and structures of the present invention. Accordingly, the present embodiments are to be considered as illustrative and not restrictive, and the invention is not to be limited to the details given herein.

What is claimed is:

1. A double layer capacitor cell, comprising:

a cell container;

a first carbon aerogel electrode provided within the cell container;

a second carbon aerogel electrode provided within the cell container;

a microfabricated dielectric layer comprising porous polyimide 1 to 2 microns thick; and an electrolyte provided within the cell container.

2. An electrochemical structure, comprising:

a first carbon aerogel electrode;

a second carbon aerogel electrode; and a microfabricated dielectric layer disposed between the electrodes.

* * * * *